(12) United States Patent
Hanes et al.

(10) Patent No.: US 7,302,108 B2
(45) Date of Patent: Nov. 27, 2007

(54) SYSTEM AND METHOD FOR CREATING INFORMATION HANDLING SYSTEM RESTORE MEDIA

(75) Inventors: Kevin Lee Hanes, Round Rock, TX (US); Kent William Nagase, Cedar Park, TX (US); Stephen Haskell Robinson, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 885 days.

(21) Appl. No.: 10/771,533

(22) Filed: Feb. 4, 2004

(65) Prior Publication Data

US 2005/0229047 A1    Oct. 13, 2005

(51) Int. Cl.
*G06K 9/40* (2006.01)
(52) U.S. Cl. ............... 382/254; 382/260; 382/275; 382/303; 358/3.26; 358/3.27; 358/463; 713/154; 713/155; 713/160
(58) Field of Classification Search ............... 382/260, 382/275, 303; 358/3.26, 3.27, 463; 713/154, 713/155, 160
See application file for complete search history.

(56) References Cited

U.S. PATENT DOCUMENTS

| 5,379,436 | A | * | 1/1995 | Tanaka ..................... 713/300 |
| 5,596,711 | A | * | 1/1997 | Burckhartt et al. ........... 714/23 |
| 5,732,268 | A | * | 3/1998 | Bizzarri ........................ 713/2 |
| 5,894,571 | A | * | 4/1999 | O'Connor ..................... 713/2 |
| 5,978,912 | A | * | 11/1999 | Rakavy et al. ................. 713/2 |

* cited by examiner

*Primary Examiner*—Yosef Kassa
(74) *Attorney, Agent, or Firm*—Hamilton & Terrile, LLP; Robert W. Holland

(57) ABSTRACT

Restore media, such as a CD, for restoring an information handling system to a manufacture state is automatically created from the manufacture image and descriptive files used to create the manufacture load script. A restore media adapter expands the manufacture image to determine the manufacture state partitions, associates identification information metadata with the image, generates restore media load script to install the image on an information handling system with compatible partitions, and formats the image and load script as virtual restore media, such as a virtual CD. The virtual restore media acts as a master for archiving and communicates through electronic communication, such as a network, to a replicator for mass production of restore media.

20 Claims, 2 Drawing Sheets

SYSTEM AND METHOD FOR CREATING INFORMATION HANDLING SYSTEM RESTORE MEDIA

BACKGROUND OF THE INVENTION

1. Field of the Invention

The present invention relates in general to the field of information handling system restore media, and more particularly to a system and method for creating a CD to restore an information handling system image to a desired state, such as an initial manufacture state.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to manage the wide variety of information handling system configurations that are available, businesses often purchase information handling systems in sets having identical or nearly identical hardware and software configurations. In some instances, a business provides an information handling system manufacturer with an image having the business' desired software configuration to load on information handling systems built by the manufacturer with the business' desired hardware configuration. Information handling system manufacturers typically store the image on a network with manufacturing load scripts that copy the image to manufactured information handling systems with conventional imaging applications, such as Ghost and Powerquest. Thus, the business gets sets of information handling systems that make information technology administration more manageable. To aid in this management, manufacturers typically provide a restore media, generally a CD, that restores the factory software state existing after initial manufacture to an information handling system by copying the image used at manufacture back onto the information handling system. The restore media is used to re-image inoperative systems or to prepare systems with replaced hard disc drives for use by loading the desired image.

Typically a restore CD is manually created with custom engineering separate from the manufacturing image in what is generally a relatively lengthy cycle time. An engineer generally must prepare CD load scripts that enable the restore CD to re-image an information handling system automatically. The manual engineering of CD load scripts often introduces process variations that impact the quality of the restore CD as well as an image restored by the CD. Additional errors are sometimes introduced when the restore CD is initially burned, either inadvertently by the engineer or through hardware or software errors. After the initial restore CD is burned, it is typically labeled with explanatory documents included, and then sent as a master copy to a replicator to have a copy made for each information handling system having the associated image. Errors are sometime introduced at labeling and during replication that impact the quality of the restore CDs that are mass produced for distribution with manufactured systems. Such restore CD errors have an especially negative impact on the experience of information handling system users since users who have turned to the restore CD are already having difficulties. Further, manual engineering of restore CDs does not scale well to mass production, has poor repeatability and has difficulty adapting to product divergence from an initial factory build to later-developed configurations. In addition, manual handling of the master tends to be time consuming and subjects the master to risk of damage.

SUMMARY OF THE INVENTION

Therefore a need has arisen for a system and method which automates creation and manufacture of information handling system restore media.

In accordance with the present invention, a system and method are provided which substantially reduce the disadvantages and problems associated with previous methods and systems for creating information handling system restore media. An adapter accepts the image and load script used for manufacture of an information handling system to automatically create a restore media that restores the information handling system to a manufacture state.

More specifically, a restore media adapter accepts the image and load script used for manufacture of an information handling system and creates a virtual restore media adapted for electronic transfer and replication to mass produce restore media. The restore media loads the image to an information handling system hard disc drive to restore the information handling system to the manufacture state. A partition engine applies the manufacture image and load script to expand the image and determine partitions of the image. An identification metadata engine associates identification information with the restore media for logging creation and verifying subsequent use of the restore media to restore the image to an information handling system. A load script engine uses the partition information, the manufacture image and the manufacture load scripts to create restore media load scripts that control downloading of the image from the restore media to the information handling system. An image engine formats the image and restore media load scripts into a virtual media image for copying to a media so that a replicator is able to mass produce restore media for inclusion with similarly configured information handling systems.

The present invention provides a number of important technical advantages. One example of an important technical advantage is that restore media creation and manufacture are automated to reduce or eliminate the introduction of errors that sometimes result from manual engineering of restore media. For instance, automated CD load scripts provide consistent, scalable and error-free image restoration for users. Metadata files reduce inadvertent labeling errors and support automated process controls for improved tracking of media, allowing isolation and correction of any errors that do arise. The use of a virtual master CD in the form of ISO files reduces the risk of introduction of errors by the burning of a master restore CD and allows electronic versus physical delivery of a master to a replicator for mass manufacture of restore CDs. Thus, automated restore CD creation improves quality at reduced cost and with reduced cycle times to better adapt to evolving information handling system configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated generation of a restore media to restore an information handling system to its manufacture state provides improved quality with reduced expense for mass producing restore media included with a manufactured information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
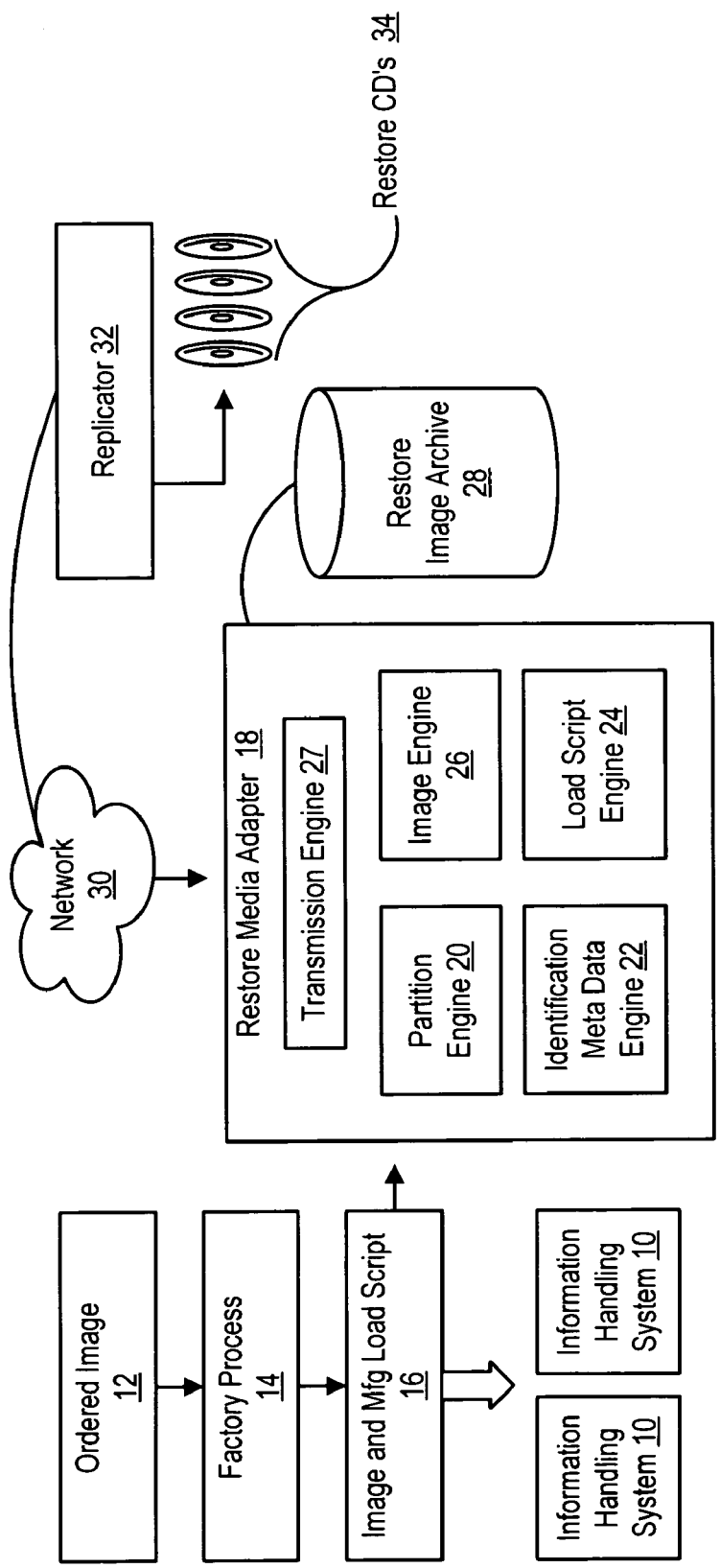
FIG. 1 depicts a block diagram of a system for automated generation of information handling system restore media.

Referring now to FIG. 1, a block diagram depicts a system for automated generation of an information handling system restore CD media. Information handling systems 10 are manufactured to load images 12 that are ordered by customers. A factory process 14 accepts ordered images 12 to generate a manufacture image and manufacture load script, such as is disclosed by U.S. patent application Ser. No. 10/292,035, entitled "Method and System for Information Handling System Custom Image", by Mark Andrew, Kevin Hanes, Jefferson Raley and Kent Nagase, filed on Nov. 12, 2002 and assigned to Dell. The manufacture image and load script 16 transfer the ordered image 12 to information handling systems 10 with conventional tools, such as Ghost and Powerquest.

A restore media adapter 18 interfaces with the factory manufacturing process 14 as a plug-in that accepts the manufacture image and load script 16. Restore media adapter 18 uses the manufacture image and load script 16 to automatically create a virtual master restore CD having an image and CD load script operable to restore an information handling system to its state at completion of manufacture. Restore media adapter 18 detects new images at factory process 14, creates a restore CD project and retrieves the associated image and load script 16 to local memory. A partition engine 20 expands the image to determine and identify the partitions within the image. A partition is a logical division of a physical storage, such as a hard disc drive, that is independent of the physical storage devices. For instance, separate partitions are often used within an information handling system hard disc drive with one partition used for the operating system, another for data and a third smaller partition used for maintenance. Partition engine 20 identifies the partitions as static or dynamic with static partitions defined by a definitive size and dynamic partitions defined by a relative size. Thus, in a restore operation from a restore CD to an information handling system having different sized hard disc drive, the static partitions are reset to the definitive size while the dynamic partition sizes are set by reference to their relative size.

An identification metadata engine 22 associates identification information with the image as a metadata file, such as the customer name, the line of business, model and part numbers, etc . . . A load script engine analyzes the manufacture image and load script to prepare a restore load script that controls the transfer of the image from a restore media, such as a CD, to an information handling system. For instance, the restore load script provides an ordered set of instructions to download the image with appropriate tools, including the preparation of a hard disc drive, the partitioning of the hard disc drive and the loading of the image in the appropriate partitions. The loading of the image from a restore CD instead of a network produces the same hard disc drive image but uses distinct scripts. The restore load script produced by the load script engine has to manage different considerations than the manufacture load script, however both scripts are generated from a common descriptive file. The image, documents, tools and load scripts are then provided to an image engine 26 that formats the information according to the ISO 9660 and Joliet standards to create one or more virtual restore media that defines the content of each restore media. The identification metadata file is used for labeling the restore CD. The virtual restore media content and directory structure are saved as an ISO compliant image, without the actual creation of a physical media, such as with the MKISOFS tool that converts a CD image into an ISO image. The virtual restore media is logged and saved to restore image archive 28.

Once a virtual restore media is defined, several options are available for its transfer to a replicator 32 for mass production of restore CDs 34. For instance, a copy of the virtual restore media may be physically written for shipment to replicator 32. Alternatively, an electronic version may be communicated through network 30, such as by File Transfer Protocol through the Internet. Transfer through a network is aided by compression of the image, such as is provided by conventional tools like GHOST and POWERQUEST. In one embodiment, a transmission engine 27 calculates a hash code for the image which is included in the electronic transfer and used to verify the validity of the transmission by separate hash code calculation at replicator 32 and comparison between the hash codes.

Figure 2:
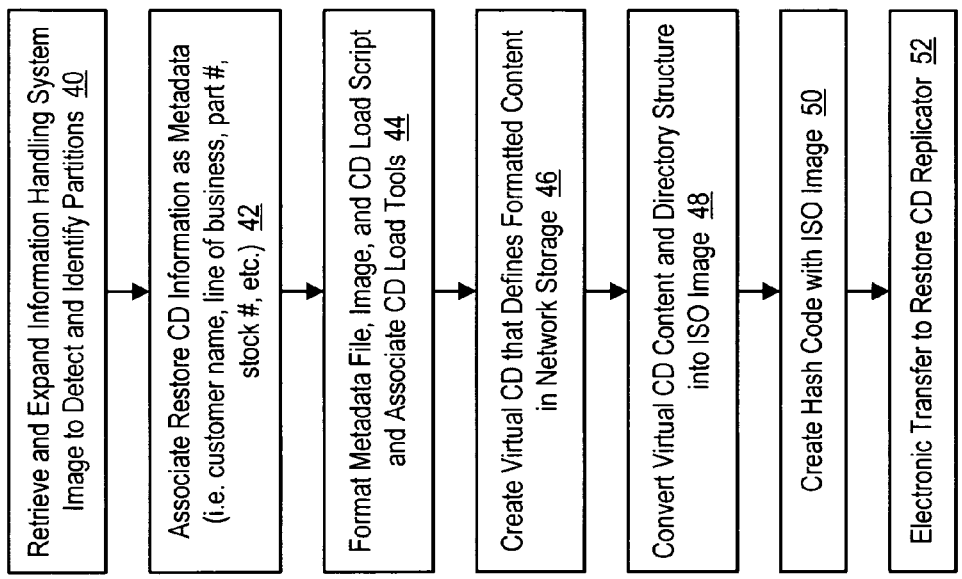
FIG. 2 depicts a flow diagram of a process for automated generation of information handling system restore media.

Referring now to FIG. 2, a flow diagram depicts a process for automated generation of information handling system restore CD media. The process begins at step 40 with the retrieval and expansion of the information handling system manufacture image to detect and identify the partitions. At step 42, restore identification information is associated with the manufacture image as a metadata file. At step 44, the information for the restore media is formatted, including the manufacture image and the descriptive file used to create the manufacture load script, to support creation of a CD load script. The CD load script includes appropriate load tools that will support restoration of the image to an information handling system to bring the information handling system to a manufacture state. At step 46, a virtual CD is created in network or local storage to define the image and CD load script with the metadata identification information associated with the virtual CD for eventual use in labeling of manufactured CDs. At step 48, the virtual CD content and directory structure are formatted to provide an ISO image of the virtual CD that is copied to a physical CD. At step 50, the restore media image hash code is created for transmission verification and, at step 52, the virtual CD image is transferred electronically, such as by FTP, to a replicator. The replicator verifies the transmission accuracy and burns the image to CDs for mass production and distribution with associated information handling systems.

Although the present invention has been described in detail, it should be understood that various changes, substitutions and alterations can be made hereto without departing from the spirit and scope of the invention as defined by the appended claims.

What is claimed is:

1. A system for creating restore media for restoring an information handling system to a desired configuration state, the system comprising:
   a partition engine operable to accept an information handling system image, the image having partitions, and to determine the partitions of the image;
   an identification engine operable to associate identification information with the image;
   a load script engine operable to prepare scripts to load the image from a restore media to an information handling system with the determined partitions; and
   an image engine operable to generate an image of a restore media having the information handling system image and the scripts configured to restore the information handling system image to an information handling system.

2. The system of claim 1 further comprising a replicator interfaced with the image engine and operable to copy the restore media image to a media.

3. The system of claim 2 wherein the media comprises a CD.

4. The system of claim 2 wherein the media comprises a DVD.

5. The system of claim 2 wherein the replicator is located distal the image engine, the image engine further operable to communicate the restore media image to the replicator through a network.

6. The system of claim 5 further comprising a transmission engine operable to create a hash code from the image for verification of transmission accuracy at the replicator.

7. The system of claim 2 wherein the restore media image comprises an image in compliance with the ISO 9660 and Joliet standards.

8. The system of claim 1 wherein the information handling system image comprises an initial manufacture image, the restore media image operable to restore the initial manufacture image to the information handling system.

9. The system of claim 1 further comprising a restore image archive interfaced with the image engine and operable to archive restore media images.

10. A method for creating a restore media for restoring an information handling system manufactured with an image to an initial manufacture state, the method comprising:
    determining the partitions of the manufacture state;
    preparing one or more restore scripts to download the image from a restore media to an information handling system with compatible partitions;
    creating a virtual restore media with the image and restore script;
    converting the virtual restore media into one or more restore images adapted to copy to media; and
    communicating the restore images to a replicator to replicate the restore images on physical media.

11. The method of claim 10 wherein determining the partitions further comprises:
    expanding the image and manufacture load scripts; and
    determining the partitions from the expanded image.

12. The method of claim 10 further comprising:
    preparing identification metadata; and
    associating the identification metadata with the virtual restore media for use in labeling physical media.

13. The method of claim 10 wherein preparing one or more restore scripts to download the image further comprises:
    identifying tools to prepare and load an image from a media to a hard disc drive; and
    automatically preparing scripts to apply the tools to prepare the hard disc drive with compatible partitions.

14. The method of claim 13 wherein the manufacture state comprises static and dynamic partitions and wherein automatically preparing scripts further comprises preparing the hard disc drive to have static partitions of substantially the same size as the manufacture state and dynamic partitions of substantially proportionate size as the manufacture state.

15. The method of claim 10 wherein converting the virtual restore media further comprises generating an ISO image for copying to a CD.

16. The method of claim 10 wherein converting the virtual restore media further comprises generating an ISO image for copying to a DVD.

17. The method of claim 10 wherein communicating further comprises:
    creating a hash code associated with the image;
    communicating the virtual restore media and hash code through a network to a distal replicator;
    recreating the hash code at the replicator with the virtual restore media; and
    verifying communication of a valid virtual restore media by comparing the communicated and re-created hash codes.

18. The method of claim 10 wherein communicating further comprises sending the restore images by file transfer protocol through the Internet.

19. The method of claim 10 further comprising automatically logging each virtual restore media created.

20. The method of claim 19 further comprising automatically archiving each virtual restore media created.

* * * * *